(12) United States Patent
Bhosale et al.

(10) Patent No.: US 10,303,829 B2
(45) Date of Patent: May 28, 2019

(54) AUTOMATED METHOD FOR INTEGRATED ANALYSIS OF BACK END OF THE LINE YIELD, LINE RESISTANCE/CAPACITANCE AND PROCESS PERFORMANCE

(71) Applicant: INTERNATIONAL BUSINESS MACHINES CORPORATION, Armonk, NY (US)

(72) Inventors: Prasad Bhosale, Albany, NY (US); Michael Rizzolo, Albany, NY (US); Chih-Chao Yang, Glenmont, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 14 days.

(21) Appl. No.: 15/609,559

(22) Filed: May 31, 2017

(65) Prior Publication Data

US 2018/0349535 A1 Dec. 6, 2018

(51) Int. Cl.
*G06F 17/50* (2006.01)
*H01L 21/66* (2006.01)
*G06N 5/02* (2006.01)

(52) U.S. Cl.
CPC ...... *G06F 17/5036* (2013.01); *G06F 17/5081* (2013.01); *G06N 5/025* (2013.01); *H01L 22/20* (2013.01); *G06F 2217/12* (2013.01)

(58) Field of Classification Search
CPC .......... G06F 17/5036; G06F 17/50814; G06F 17/5081; G06N 5/025; H01L 22/20
See application file for complete search history.

(56) References Cited

U.S. PATENT DOCUMENTS 7,280,229 B2   10/2007  Li et al.
7,383,521 B2*   6/2008  Smith ............... G06F 17/5068
                                                                716/114

(Continued)

OTHER PUBLICATIONS

Chen, K. et al., "Wafer Die Yield Prediction by Heuristic Methods" 2010 40th International Conference on Computers and Industrial Engineering (CIE) (Jul. 2010) pp. 1-4.

(Continued)

*Primary Examiner* — Vuthe Siek
(74) *Attorney, Agent, or Firm* — Tutunjian & Bitetto, P.C.; Vazken Alexanian (57) ABSTRACT

A method of electrical device manufacturing that includes measuring a first plurality of dimensions and electrical performance from back end of the line (BEOL) structures; and comparing the first plurality of dimensions with a second plurality of dimensions from a process assumption model to determine dimension variations by machine vision image processing. The method further includes providing a plurality of scenarios for process modifications by applying machine image learning to the dimension variations and electrical variations in the in line electrical measurements from the process assumption model. The method further includes receiving production dimension measurements and electrical measurements at a manufacturing prediction actuator. The at least one of the dimensions or electrical measurements received match one of the plurality of scenarios the manufacturing prediction actuator using the plurality of scenarios for process modifications effectuates a process change.

10 Claims, 8 Drawing Sheets

(56) References Cited

U.S. PATENT DOCUMENTS

| | | | |
|---|---|---|---|
| 7,421,414 | B2 | 9/2008 | Liu et al. |
| 7,522,294 | B2 | 4/2009 | Chu et al. |
| 7,895,545 | B2* | 2/2011 | Cohn .................. G06F 17/5077 716/129 |
| 7,949,618 | B2 | 5/2011 | Bischoff et al. |
| 8,464,194 | B1 | 6/2013 | Agarwal et al. |
| 8,490,244 | B1* | 7/2013 | Joshi .................. G06F 17/5068 716/110 |
| 8,744,607 | B2 | 6/2014 | Kaushal et al. |
| 9,275,335 | B2 | 3/2016 | Kaushal et al. |
| 9,362,128 | B2* | 6/2016 | Zhu ..................... H01L 27/0629 |
| 9,589,847 | B1* | 3/2017 | Chi ................. H01L 21/823475 |
| 9,672,320 | B2* | 6/2017 | Chang ................. G06F 17/5081 |
| 2007/0185684 | A1 | 8/2007 | Vuong et al. |
| 2009/0063077 | A1 | 3/2009 | Liu et al. |
| 2016/0141147 | A1 | 5/2016 | Brogden et al. |
| 2016/0148850 | A1 | 5/2016 | David |

OTHER PUBLICATIONS

Dworkin, L., "Automated Workflow Improves Speed and Precision of S/TEM Process Monitoring for 22 nm FinFET Structures" Electronic Device Failure Analysis (Nov. 2013) pp. 26-33, vol. 15.4.

Kang, B.-S. et al., "Hybrid machine learning system for integrated yield management in semiconductor manufacturing" Expert Systems With Applications (Oct. 1998) pp. 123-132, vol. 15, No. 2.

Shaapur, F. et al., "Low-k thin films analyzed using automated SEM sample preparation" Solid State technology (Oct. 2000) pp. 167-171, vol. 43, No. 10.

Shin, C. K. et al., "A machine learning approach to yield management in semiconductor manufacturing" International Journal of Production Research (Nov. 2000) pp. 4261-4271, vol. 38, No. 17.

Tracy, B. et al., "Adopting low-voltage STEM and automated sample prep to perform IC failure analysis" Micro (Jul. 2004) pp. 87-94, vol. 22, No. 6.

* cited by examiner

AUTOMATED METHOD FOR INTEGRATED ANALYSIS OF BACK END OF THE LINE YIELD, LINE RESISTANCE/CAPACITANCE AND PROCESS PERFORMANCE

BACKGROUND

Technical Field

The present invention generally relates to semiconductor manufacturing, and more particularly to process control techniques for semiconductor manufacturing processes.

Description of the Related Art

The semiconductor industry has been characterized by sophisticated high-tech equipment, a high degree of factory automation, and ultra-clean manufacturing facilities that cost billions of dollars in capital investment and maintenance expense. In order to achieve acceptable yield and device performance levels, very tight process specifications must be achieved.

SUMMARY

In one embodiment, a method of automated back end of the line (BEOL) analysis of semiconductor device manufacturing is provided that may include measuring a first plurality of dimensions from a back end of the line (BEOL) structure of an electrical device and electrical performance of the BEOL structure; and comparing the first plurality of dimensions with a second plurality of dimensions from a process assumption model to determine dimension variations by machine vision image processing. The method can continue with providing a plurality of scenarios for process modifications by applying machine image learning to the dimension variations and electrical variations in the in line electrical measurements from the process assumption model. The plurality of scenarios for process modifications are responsive to dimension and electrical variations in production BEOL structures. The method may also include receiving production dimension measurements and production electrical measurements from a production track at a manufacturing prediction actuator, wherein when at least one of the dimensions or electrical measurements received match one of the plurality of scenarios the manufacturing prediction actuator using the plurality of scenarios for process modifications effectuates a process change to bring production of the BEOL within the process assumption model.

In another embodiment, the method includes a system for automated back end of the line (BEOL) analysis of semiconductor device manufacturing. In some embodiments, the system may include an optical measuring device for measuring a first plurality of dimensions from a back end of the line (BEOL) structure of an electrical device; and an in line electrical performance measuring apparatus for measuring in line resistance of BEOL structures. The system further includes a machine vision image processor for comparing the first plurality of dimensions with a second plurality of dimensions from a process assumption model to determine dimension variations, and a machine learning engine for applying machine learning to the dimension variations and electrical variations in the in line electrical measurements from the process assumption model. The plurality of scenarios for process modifications are responsive to dimension and electrical variations in production BEOL structures. The system can further include a manufacturing prediction actuator for receiving production dimension measurements and production electrical measurements from a production track, wherein when at least one of the dimensions or electrical measurements received match one of the plurality of scenarios the manufacturing prediction actuator effectuates a process change to bring production of the BEOL within the process assumption model.

In yet another embodiment a computer program product is provided. In some embodiments, the computer program produce includes a computer readable storage medium comprising a computer readable program for electrical device manufacturing. The computer readable program when executed on a computer causes the computer to perform the steps of comparing a first plurality of dimensions measured from a back end of the line (BEOL structure with a second plurality of dimensions from a process assumption model to determine dimension variations by machine vision image processing; and providing a plurality of scenarios for process modifications by applying machine learning to the dimension variations and electrical variations in the in line electrical measurements from the process assumption model, wherein the plurality of scenarios for process modifications are responsive to dimension and electrical variations in production BEOL structures. The method further includes receiving production dimension and electrical measurements at a manufacturing prediction actuator, wherein when at least one of the dimensions or electrical measurements received match one of the plurality of scenarios, the manufacturing prediction actuator using the plurality of scenarios for process modifications effectuates a process change to bring production of the BEOL structures within the process assumption model. The computer readable storage medium may be non-transitory.

BRIEF DESCRIPTION OF THE DRAWINGS

The following description will provide details of preferred embodiments with reference to the following figures wherein.

DETAILED DESCRIPTION

In semiconductor manufacturing rapid cost and effective analysis of back end of the line (BEOL) resistance and yield variation is needed. Currently, chip yield and performance parameters are correlated to structural changes, metrology data (defects) and process parameters manually. The analysis process is slow, inefficient and labor intensive. Manual intervention by engineers can occur at several steps. In some embodiments, the methods, systems and computer program products provided herein may provide a faster and more efficient method of back end of the line (BEOL) analysis of semiconductor device manufacturing using automated sample preparation, automated image processing, and machine learning algorithms to correlate process parameters to back end of the line (BEOL) interconnect performance parameters, such as resistance and yield, changes in the geometry of metal lines and metal line related structures, and other metrology data. Exemplary applications/uses to which the present invention can be applied include, but are not limited to process control for structures in integrated circuits, such as: metal lines, interconnects, contacts, contact pads, isolation structures, interlevel dielectrics, intralevel dielectrics, as well as other back end of the line structures.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
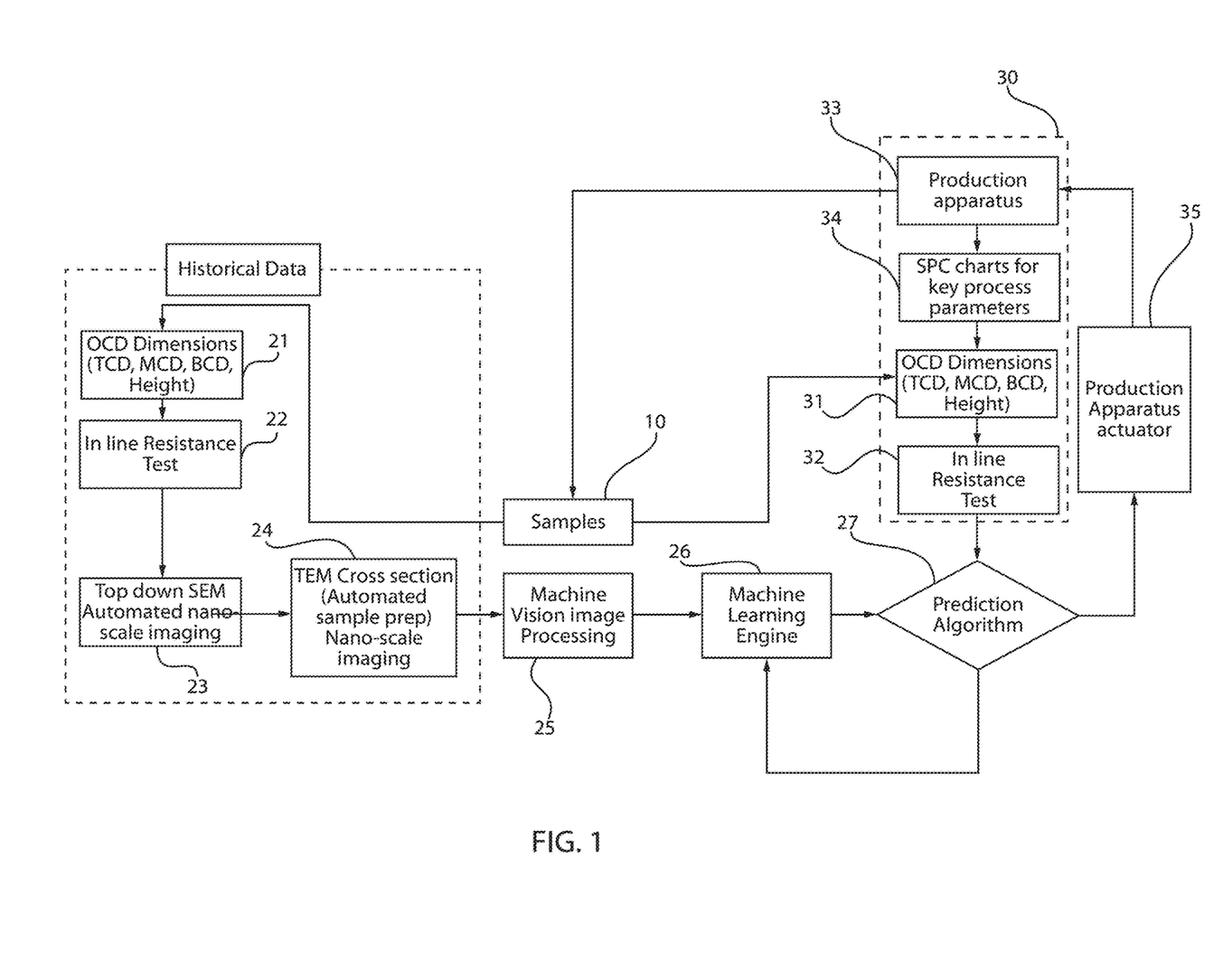
FIG. 1 is a block/flow diagram showing a system/method of an automated method for integrated analysis of back end of the line (BEOL) structures to determine whether the process flow for forming the BEOL structures is within the process window, in accordance with an embodiment of the present invention.

Referring now to the drawings, in which like numerals represent the same or similar elements and initially to FIG. 1, an automated back end of the line (BEOL) analysis of semiconductor device manufacturing is provided. In some embodiments, a method is provided for determining the most likely failure modes for back end of the line (BEOL) metal line structures post electroplating and chemical mechanical planarization; determining the responsible sectors/tools/recipes; and applying corrective actions when applicable in real time.

The method begins with providing a plurality of wafers that have been processed through front end of the line (FEOL) processing and back end of the line processing (BEOL). The wafers are analyzed to provide historical data 10 that is used in machine learning as part of the automated process flow that is described herein with reference to FIGS. 1-7. The wafers may include a semiconductor substrate, such as a semiconductor on insulator (SOI) substrate or bulk substrate, that is composed of a semiconductor material, such as a type IV semiconductor material, e.g., silicon, silicon germanium and/or germanium, or a type III-V semiconductor material, e.g., gallium arsenide (GaAs). The semiconductor substrate may be processed using FEOL processing to include devices, such as transistors, e.g., field effect transistors (FETs). Following FEOL processing, the wafers are further processed with back end of the line (BEOL) processing, which includes the formation of dielectric layers, interlevel dielectric layers, metal lines, interconnects, metal vias, contact pads, contacts and other structures used for electrical communication. The wafers following FEOL and the BEOL processing provide the samples 10 depicted in FIG. 1.

A plurality of samples 10 may be used to provide data, i.e., historical data, for the processing of the samples 10 through a historical data generator 20. For example, the number of samples 10 that are used to provide the historical data can be equal to 100 wafers. It is noted that this only represents one example of the number of wafers that are used to generate the historical data, and is not intended to limit the present disclosure solely thereto. For example, the number of samples 10 that are used to provide the historical data through the historical data generator 20 can include 25 wafers to 175 wafers. In some embodiments, the plurality of samples 10 that provide the historical data are selected during a point in manufacturing in which the samples 10 being manufactured are within the process assumptions, i.e., the dimensions and electrical performance, that are the specification for the product being produced.

In some embodiments, the historical data generating generator 20 includes at least one processor, i.e., hardware processor, that executes instructions stored on a memory for at least one of measuring and storing data for the geometry and/or electrical performance of a structural feature that in some embodiments is formed during back end of the line processing. For example, the structural feature, i.e., BEOL structural feature, being measured and recorded for producing the historical data through the historical data generator 20 may include optical critical dimensions (OCD) 21, which are taken using an optical diffraction measurement, which can begin step 1 of the method depicted in FIG. 2. The optical critical dimension (OCD) 21 can be taken from metal lines, and can include a value for a top critical dimension (TCD), a middle critical dimension (MCD) and a bottom critical dimension (BCD). The optical critical dimensions (OCD) can be measured for the width dimension of the metal line, but in some examples height dimension of the line and the length of the metal line can also be considered.

It is noted that the structural detail being measured from the back end of the line (BEOL) structure is not limited to only metal lines, as other trench structures and other electrical communication structures, e.g., metal via structures. Further, the BEOL structure detail being measured can be the pitch separating electrical communications structures, e.g., pitch separating metal lines and/or vias, and the BEOL structure being measured can also be portions of dielectric material, such as interlevel dielectrics that are separating electrical communication structures from one another.

Referring to FIG. 1, the historical data generator 20 also includes an in-line electrical property testing apparatus 22. The in-line electrical property testing apparatus 22 may be an in-line resistance test for determining the resistance of the metal lines, and/or vias, in the back end of the line (BEOL) structure, which is another process step that can be performed as part of step 1 of FIG. 2. The in-line electrical property testing apparatus 22 is not limited to only testing line resistance.

Referring to FIG. 1, in some embodiments, the historical data generator 20 also includes top down scanning electron microscope (SEM) automated nano-scale imaging 23, and a cross-section transmission electron microscope (TEM) 24. These tests further define the dimensions taken for determining optical critical dimensions (OCD) 21 as measured using the optical diffraction measurement, which can provide another process step that can be performed as part of step 1 of FIG. 2. Further, the cross section and top down images correlate the images to dimensions, which can then be used with machine image processor 25 and machine learning device 26. In some embodiments, the methods, systems and computer program products that are described herein can include cross-section TEM and top down SEM images to obtain nano/micro-scale structural details for the samples 10.

Referring to FIG. 1, using the machine image processor 25, the methods, systems and computer program products provided herein provide a faster and more efficient method of back end of the line (BEOL) analysis of semiconductor device manufacturing. In some embodiments, in machine image processing 25, after the image is acquired from the down scanning electron microscope (SEM) automated nano-scale imaging 23, and the cross-section transmission electron microscope (TEM) 24, digital image processing techniques are used to extract the information related to the critical dimensions of the samples 10, and the system can make decisions (such as pass/fail) based on the extracted information. The machine image processor 25 may include at least one processor and memory including instructions to be executed by the processor for correlating the images, i.e., down scanning electron microscope (SEM) automated nano-scale imaging 23 and the cross-section transmission electron microscope (TEM) 24, to the OCD dimensions 21. Multiple stages of processing can be used in a sequence that ends up as a desired result. A typical sequence might start with tools such as filters which modify the image, followed by extraction of objects, then extraction (e.g. measurements, reading of codes) of data from those objects, followed by communicating that data, or comparing it against target vales to create and communicate "pass/fail" results.

Machine vision image processing methods can include stitching/registration, which is the combining of adjacent 2D or 3D images; and filtering, e.g., morphological filtering). Machine vision image process can also include thresholding, and pixel counting, i.e., the device counts the number of light or dark pixels. Machine vision image processing methods that can also be provided by the machine image processor 25 may also include segmentation, which is the partitioning a digital image into multiple segments to simplify and/or change the representation of an image into something that is more meaningful and easier to analyze. Machine vision image processing methods that can be provided by the machine image processor 25 can also include edge detection, which is the finding of the edges of objects. Machine vision image processing methods that can be provided by the machine image processor 25 can also include color analysis, which are used to identify parts, products and items in an image using color, assess quality from color, and isolate features using color. Machine vision image processing methods that can be provided by the machine image processor 25 can also include blob discovery and manipulation, which are used to identify parts, products and items in an image using color, assess quality from color, and isolate features using color. Machine vision image processing methods that can be provided by the machine image processor 25 can also include blob discovery and manipulation, which are used to identify parts, products and items in an image using color, assess quality from color, and isolate features using color. Machine vision image processing methods that can be provided by the machine image processor 25 can also pattern recognition including template matching, which includes finding, matching, and/or counting specific patterns. In yet another example, the machine vision image processing methods that can be provided by the machine image processor 25 can also include gauging/metrology, which is a measurement of object dimensions (e.g. in pixels, inches or millimeters).

Figure 2:
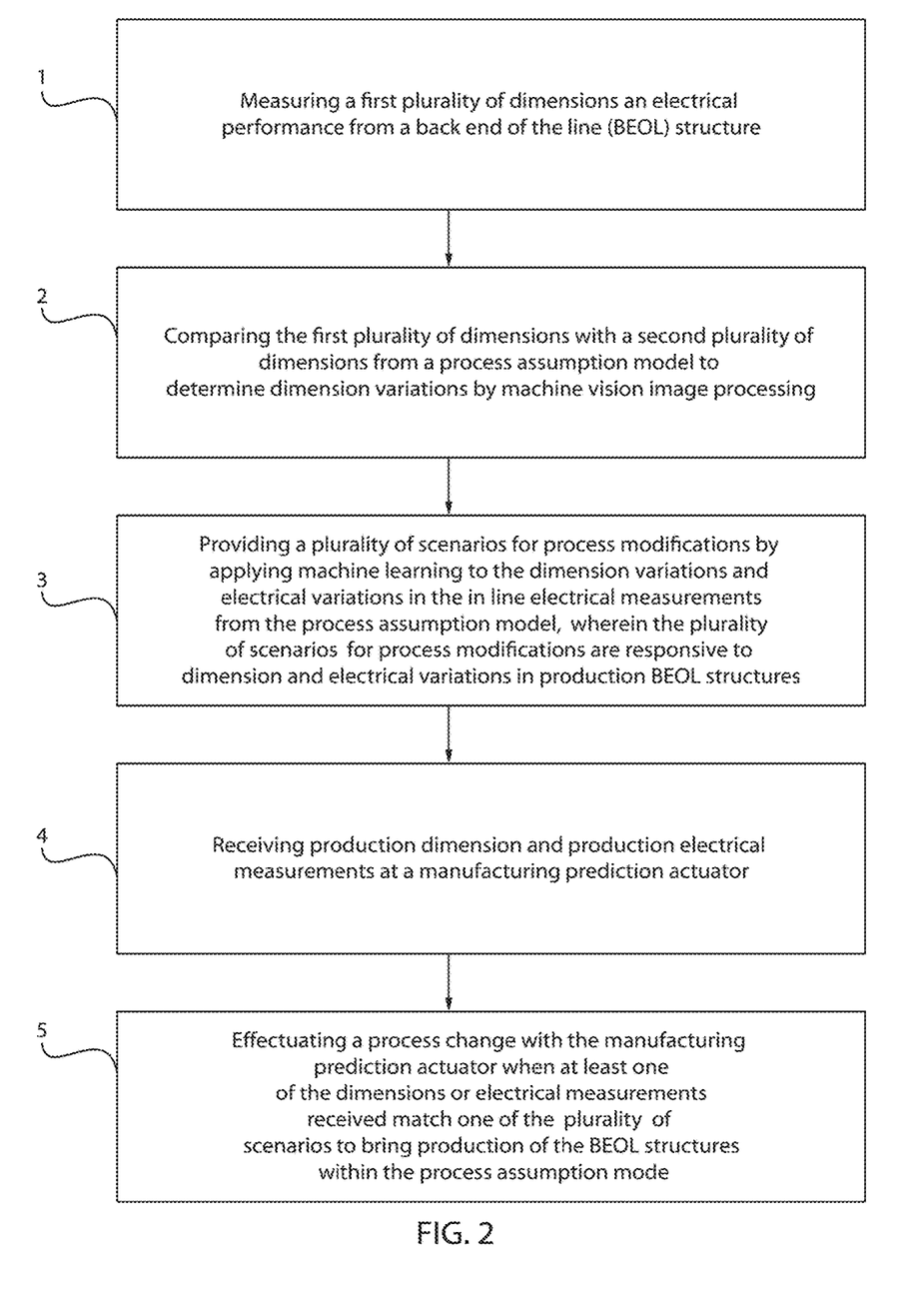
FIG. 2 is a flow diagram of an automated method for integrated analysis of back end of the line (BEOL) structures.

It is noted that the machine image processor 25 may employ any of the aforementioned methods, and can employ combinations of the aforementioned methods to perform step 2 of the method depicted in FIG. 2. The machine image processor 25 using the above described methods analyze the structural details of the back end of the line (BEOL) structures and compare those structural details to a standard process assumption model. The "standard process assumption model" is the specifications for which the device, i.e., device on the wafer, that the device is being manufactured to. For example, the standard process assumption model may dictate that the metal lines have a line height spec of 60 nm with an allowable variation from the design spec of =1-5 nm. Depending on whether the manufacturing process is operating within its correct process window, the manufacturing process will or will not provide wafers having back end of the line features meeting the standard process assumption model. The methods, systems and computer program products being described herein automate the changes needed to the process flow to keep the wafers being produced having back end of the line (BEOL) features within the standard process assumption model, as well as electrical performance within the standard process assumption model.

The machine image processor 25 matches the dimensions taken from the samples 10 that are within the standard process assumption noting those samples, e.g., tagging those samples, as operating within a proper process window, and matches the dimension from the samples 10 that are outside the standard process assumption noting those samples, e.g., tagging those samples, as not operating within a proper process window. The process conditions, e.g., etching, chemical mechanical planarization, deposition, photolithography, metallization and other process conditions needed for manufacturing of semiconductor device components, such as back end of the line metallization, e.g., metal lines, are known for each of the samples 10. This data can be referred to as the yield to nano/micro scale structural details obtained from the machine image processor 25.

Referring to FIG. 1, the box identified by reference number 26 is a machine learning engine. In some embodiments, the machine learning engine 26 uses artificial intelligence as it enables computers to get into a mode of self-learning without being explicitly programmed. The machine learning engine 26 may include at least one processor and memory, the processor for executing instructions on the memory for the purposes of producing a manufacturing prediction actuator 27. More specifically, in some embodiments, following the operations by the machine image processor 25, the machine learning engine 26 can correlate the electrical property measurements from the in-line electrical property testing apparatus 21 and the yield to nano/micro scale structural details obtained from the machine image processor 25, in combination with data from standard process control (SPC) and fault detection classification systems, to specific variations within the process window for manufacturing the device. The standard process control (SPC) may include systems that attribute variations in processing to known variations in the wafers being produced. The fault detection classification system includes a lists of the types of processing variations that produce certain types of variations in the samples.

As noted above, each of the samples 10 is formed by a known process sequence having a number of parameters. The machine learning engine 26 can correlate variations in the dimensions taken using optical critical dimension (OCD) 31 matched to the images from the top down scanning electron microscope (SEM) automated nano-scale imaging 23, and the cross-section transmission electron microscope (TEM) 24 from the dimensions from the standard process assumption model, as well as variations in the measured electrical properties of the samples 10 from the from the in-line electrical property testing apparatus 21, and can attribute those variations to variations of the process window for different processes, e.g., lithography, etching, deposition, chemical mechanical planarization, etc., within the process sequence for manufacturing the samples 10.

The correlation of the aforementioned variations in dimensions and variations in electrical performance in the samples to variations in the process window for manufacturing the samples using the machine learning engine 26 can include decision tree learning, associated rule learning, artificial neural networks, deep tree learning, inductive logic programming, support vector machines, clustering, bayesian networks, reinforcement learning, representation learning, similarity and metric learning, sparse dictionary learning, genetic algorithms, rule-based machine learning, learning classifier systems and combinations thereof. The machine learning engine 26 can provide one embodiment of step 3 of FIG. 2.

Referring to FIG. 1, the machine learning engine 26 by correlating the variations in the dimensions of the samples 10 to variations in the process windows of the various operations, e.g., lithography, etching, deposition, planarization, and combinations thereof, and correlating taken as well as variations in the measured electrical properties of the samples 10 from the from the in-line electrical property testing apparatus 21 and employing at least one of the above mentioned forms of machine learning can provide predictive algorithm for the manufacturing prediction actuator 27 that can determine when variations in dimensions and/or electrical properties measured in production samples of wafers for BEOL structures necessitate changes to the process window for the various processes, e.g., lithography, etching, deposition, planarization and combinations thereof, employed in producing production samples. The predictive algorithm uses correlations built from machine learning, i.e., the machine learning engine 26, to suggest a most likely failure mode and which tools/recipe/process parameters are responsible for this failure.

During high volume manufacturing these algorithms provide information that illustrate the likely cause for failure with corresponding proof, e.g., images/data, statistical confidence, correlation co-efficient between resistance and failing process parameters. In some embodiments, via automated systems in connectivity with apparatuses used for the manufacturing of samples/production samples including back end of the line (BEOL) structures, such as photolithography apparatuses, etch process apparatuses, deposition apparatus, and/or planarization apparatus, the manufacturing prediction actuator 27 employing the predictive algorithm can effectuate change in the aforementioned apparatuses to improve manufacturing performance. In one embodiment, the predictive algorithm can determine whether the variations in dimensions and/or electrical problems are the result of variations in the process window of an etch process, variations in the process window of a planarization process and/or variations in the process window of a lithographic process. It is noted, that examples of predictive algorithms that are employed by the manufacturing prediction actuator 27 are described in greater detail below with reference to FIGS. 3A-6C.

Referring to FIG. 1, in some embodiments, following using the historical data 20 to provide the manufacturing prediction actuator 27, the manufacturing predication actuator 27 can then be employed during manufacturing in a manufacturing track 30, in which in response to measurements of dimensions and electrical performance of production samples, the algorithms used in the manufacturing prediction actuator 27 can provide information and make adjustments to the processes within the manufacturing track to ensure that the production samples conform to the standard process assumption model. Additionally, data taken from the sample wafers, e.g., dimension data such as measurements of the optical critical dimension (OCD) 31 that is measured using optical diffraction methods, and electrical performance measurements, such as in electrical property measurements taken using the in-line electrical property testing apparatus 31, can be used to retrain the manufacturing prediction actuator 27 through the machine learning engine 26. The manufacturing prediction actuator 27 can receive inputs from the production track 30 to provide step 4 of FIG. 2.

Referring to FIG. 1, the manufacturing track 30 can include all of the apparatus 31 that are needed for the production of sample wafers and production wafers, i.e., referred to herein interchangeably as samples 10. For example, the production apparatus 31 may include devices used in lithography. These can include spinners for the deposition of photoresist materials, light sources, mask aligners, mask writers, deep UV chambers and mask development benches. For example, the production apparatus 31 may also include film deposition and growth apparatuses, such as physical vapor deposition (PVD) apparatuses, chemical vapor deposition apparatuses, thermal evaporation deposition apparatus and combinations thereof. The production apparatus 31 may also include annealing apparatus, such as furnace annealing apparatus and rapid thermal anneal (RTA) apparatus. The production apparatus 31 may also include etching apparatus, such as reactive ion etching apparatus, plasma etching apparatus, and induced coupled plasma etchers. The production apparatus 31 may also include etching apparatus, such as reactive ion etching apparatus, plasma etching apparatus, induced coupled plasma etchers and pots, such as hot pots for wet chemical etching. The production apparatus 31 can also include polishing, grinding and cleaving apparatus, such as chemical mechanical planarization (CMP) devices, dicing saws, grinders, and polishers. It is noted that the production track 30 including the production apparatus 31 can provide samples 10 for both production, and for producing the historical data.

FIG. 1 further depicts that the production track 30 also includes statistical process control (SPC) charts for key process parameters for the processes, such as lithography, etching, deposition, planarization and combinations thereof, that are being executed by the production apparatus 33. At least one production sample 10 produced by the production apparatus 33 of the production track 30 can be then selected for characterization to determine whether the production track 30 is operating within acceptable process windows. For example, using an automated process the at least one production sample 10 may be selected, and measurements can be taken of a dimension, such as a critical dimension, of a back end of the line (BEOL) structure. The back end of the line (BEOL) structure being measured from the at least one production sample 10 can be any BEOL structure, such as the examples of BEOL structures that were described for producing the historical data. For example, the structural feature, i.e., BEOL structural feature, being measured from the at least one production sample 10 may include an optical critical dimensions (OCD) 31, which are taken using an optical diffraction measurement. The optical critical dimension (OCD) 31 can be taken from metal lines, and can include a value for a top critical dimension (TCD), a middle critical dimension (MCD) and a bottom critical dimension (BCD). The optical critical dimensions (OCD) can be measured for the width dimension of the metal line, but in some examples height dimension of the line and the length of the metal line can also be considered. The optical critical dimension (OCD) measurement 31 that is applied to the production sample 10 is similar to the optical critical dimension (OCD) measurement 21 that is described above with respect to the historical data 20. Therefore, the optical critical dimension (OCD) measurement 31 for the historical data 20 can provide further details for the optical critical dimension (OCD) measurement 31 that is applied to the at least one production sample 10. It is further noted that although the examples provided herein are directed to measurements to back end of the line structures, measurements at this stage of the process flow can also be directed to front end of the line (FEOL) structures.

Further, the at least one production sample 10 may be further characterized by measuring the electrical performance of the sample, e.g., measuring the electrical performance of a back end of the line structure, such as the in line resistance of a metal line. The electrical performance of the sample can be measured using an in-line electrical property testing apparatus 32. The in-line electrical property testing apparatus 32 may be an in-line resistance test for determining the resistance of the metal lines, and/or vias, in the back end of the line (BEOL) structure. The in-line electrical property testing apparatus 32 is not limited to only testing line resistance. Additionally, the in line electrical property testing apparatus 32 that is used to measure the electrical properties of the at least one production sample 10 is similar to the in line electrical property testing apparatus 22 that is used to measure the electrical properties of the samples 10 for the historical data 20.

Referring to FIG. 1, the dimensions taken from the at least one sample 10 from the production track 30 from the optical critical dimension (OCD) measurement 31 and the electrical characterization taken from the an in-line electrical property testing apparatus 32 are then entered into the manufacturing prediction actuator 27, which uses the prediction algorithms to determine whether the at least one sample 10 meets the standard process assumption model, and if the at least one sample 10 does not meet the specifications of the standard process assumption model what changes need to be implemented to the process window of the production apparatus 31 of the production track 30 to provide production samples 10 meeting the standard process assumption model. Examples of how the manufacturing prediction actuator 27 employs prediction algorithms to determine from measurements taken from production samples 10 what changes need to be made in the production track 30 to keep the production samples 10 performing within the standard process assumption model are described with more detail with reference to FIGS. 3A-7B. The manufacturing prediction actuator 27 correlates performance parameters like yield and resistance to the macro/nano scale structural details, such as trench dimensions, defects delamination, voids, and also correlates those parameters to key process parameters, such as process parameters to be changed in the production apparatus 31 in the production track 30.

The output from the manufacturing prediction actuator 27 can be to an apparatus actuator 35 which can make the appropriate changes to any one of the production apparatus 31 in the production track 30. For example, if the dimensions measured in the at least one sample 10 is interpreted as manufacturing prediction actuator 27 as being the result of lithography processes being operated outside of their process window, the manufacturing prediction actuator 27 can send instructions to the apparatus actuator 35. The actuator 35 can cause a change in the process conditions of the production apparatus 31 for the lithography window to change the lithography process in a manner that brings the lithography process within the appropriate process window to produce samples 10 meeting the specifications according to the standard process assumption model. This can provide one example of step 5 of FIG. 2.

FIG. 1 further illustrates how the using the data measured from the at least one sample 10 following the production track 30 is used to re-train the model, e.g., the manufacturing prediction actuator 27 including the prediction algorithm, because each data point measured can be entered into the machine learning engine 26.

Figure 3A:
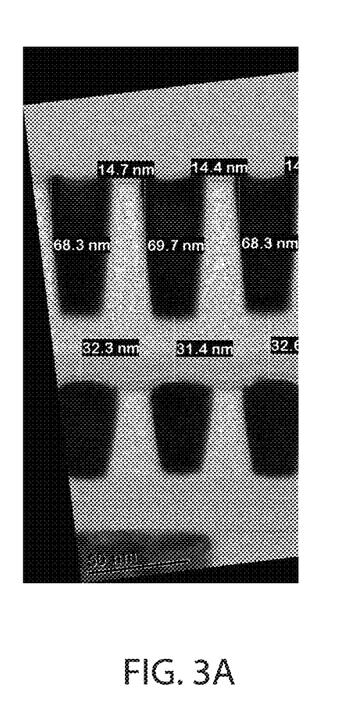
FIG. 3A is a side cross-sectional view of a plurality of metal lines in a back end of the line (BEOL) structure illustrating an image taken of the BEOL structure by automated transition electron microscope (TEM).
Figure 3B:
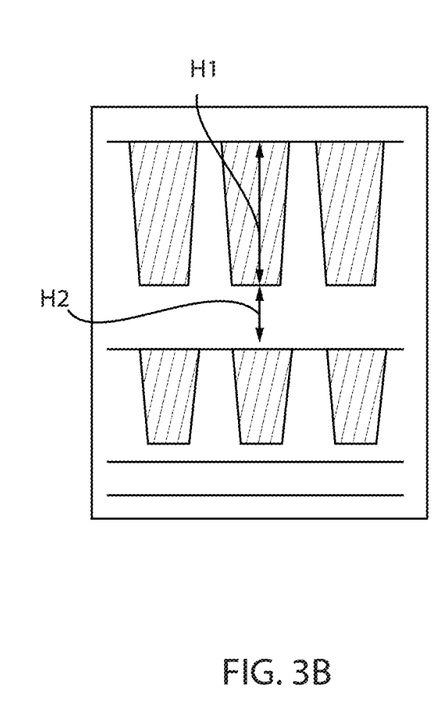
FIG. 3B is a side cross-sectional view of machine image processing of the image depicted in FIG. 3A that outputs a digital model with dimensions based on the TEM image depicted in FIG. 3A.

FIG. 3A depicts a plurality of metal lines in a back end of the line (BEOL) structure illustrating an image taken of the BEOL structure by automated transition electron microscope (TEM). The image depicted in FIG. 3A illustrates one example of the output of the transmission electron microscope (TEM) 24 that can be used to produce images for the machine image processor 25 as part of the process flow for producing the predictive algorithm used by the manufacturing prediction actuator 27, which is produced by the samples 10 of the historical data 20. The dimensions are mapped from the OCD 21 measurements to the TEM image. FIG. 3B depicts machine image processing of the image depicted in FIG. 3A that outputs a digital model with dimensions based on the TEM image depicted in FIG. 3A. FIG. 3B illustrates one example of the output of the machine image processor 25 for providing data to the machine learning engine 26. The digital model includes accurate H1, H2 dimensions based on the TEM 24, which included the dimensions measured from the OCD 21. In this example, a first height dimension is a line height H1 and a second height dimension for an interlevel dielectric layer H2 (also referred to as stud height) providing separation between stacked metal lines.

Figure 3C:
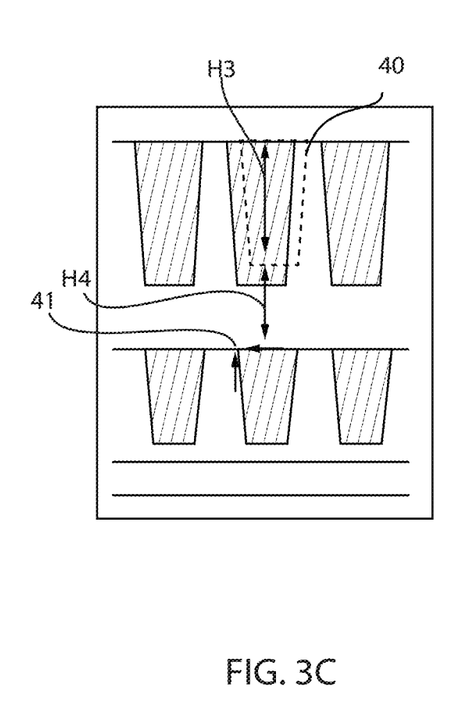
FIG. 3C is a side cross-sectional view illustrating the application of a process assumption to the digital model depicted in FIG. 3B for machine learning and prediction in providing an automated method for integrated analysis of BEOL structures to determine whether the process flow for forming the BEOL structures is within the process window.

FIG. 3C illustrates the application of a process assumption model to the digital model depicted in FIG. 3B for machine learning by the machine learning engine 26 and prediction in providing an automated method for integrated analysis of back end of the line (BEOL) structures to determine whether the process flow for forming the BEOL structures is within the process window. In this example, the process assumption model includes a specification line height H3 for the metal lines and a specification height H4 for the interlevel dielectric between the stacks of metal lines. The box with the dotted line identified by reference number 40 is an overlay of the specification for the metal line from the process assumption model. In some embodiments, variation of the process assumption model from the measured dimensions is taken from a reference point 41.

Referring to FIGS. 3A-3C, from the detected variation from the process assumption model, as well as any variation in the measured electrical performance for the samples from the process assumption model specification for the electrical performance, the learning machine engine 26 produces a predictive algorithm for use by the manufacturing prediction actuator 27 to effectuate process changes in the apparatuses 31 of the production track 30 to ensure that the back end of the line (BEOL) structures of the production samples 10 are within specification.

In one example, the predictive algorithm includes the following conditions: if an etch issue is present, e.g., reactive ion etch (RIE) process is outside the process window, the stud height for the BEOL structures will be too great, the line height may be on target, and the electrical resistance is lower than the target value. One example of this scenario is depicted in FIGS. 3A-3C, in which the comparison of the process assumption dimensions and the actual dimensions illustrates the overlay alignment (i.e., alignment in the x and y directions) was off by a minimal amount from the specification, e.g., 2 nm or less. In the example depicted in FIGS. 3A-3C, the stud height, i.e., comparison of H2 and H4, illustrates a significant difference on the order of 5 nm, i.e., a difference between 37 nm for the process assumption and 32 nm for the actual dimension. This is one factor that can be indicative of a dry etch issue. Additionally, a significant difference, e.g., a difference of 5 nm or greater, between the line height for the process assumption and the actual dimension of the line height, e.g., comparison of H1 and H3, as illustrated in FIGS. 2A-2C is another factor that is indicative of a dry etch issue. A line resistance that is less than the process assumption is also indicative of a etch issue.

In view of the dimensions for the BEOL structures depicted in FIGS. 3A-3C, and in-line resistance testing indicating that the line resistance for the metal lines is less than the process assumption value, the manufacturing prediction actuator 27 sends instructions to the apparatus actuator 35 that the etch sector, e.g., reactive ion etch (RIE) sector, is the likely origin of process deviation (line height increase=stud height decrease). For example, the manufacturing prediction actuator 27 can send instructions to the apparatus actuator 35 to make automated adjustments, e.g., gas flow, etch time etch, to the etch apparatus 31 in the production track 30.

Figure 4A:
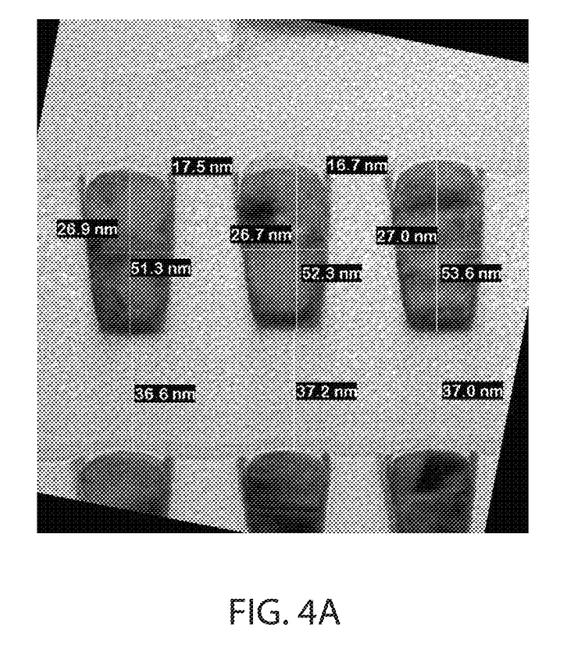
FIG. 4A is a side cross-sectional view illustrating an image taken of the BEOL structure by automated TEM for detection of variations within a chemical mechanical planarization (CMP) processes.
Figure 4B:
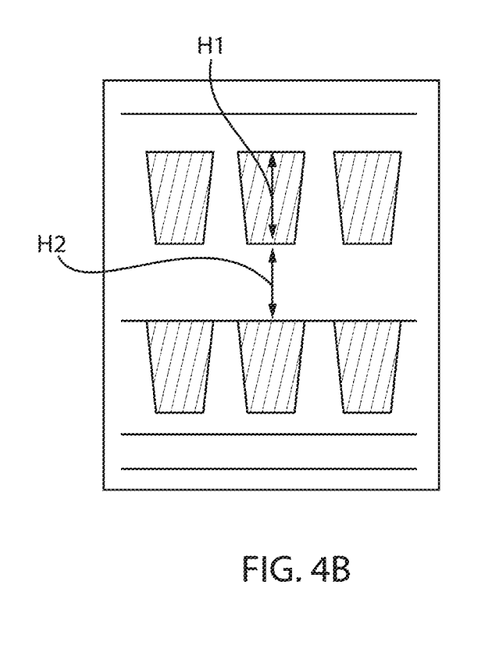
FIG. 4B is a side cross-sectional view of machine image processing of the image depicted in FIG. 4A that outputs a digital model with dimensions based on the TEM image depicted in FIG. 4A.
Figure 4C:
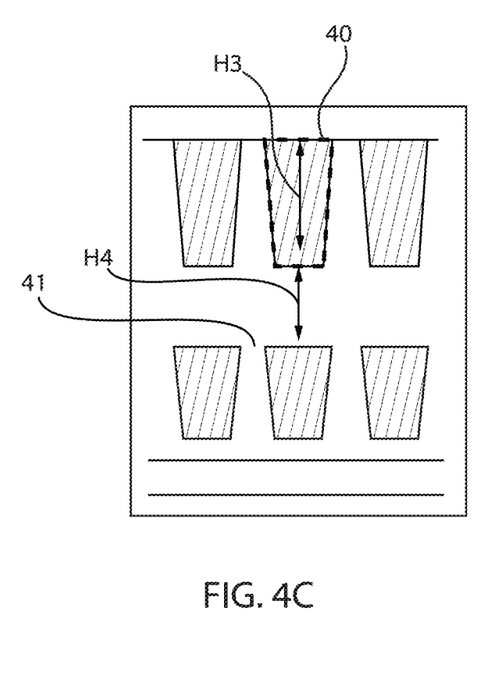
FIG. 4C is a side cross-sectional view illustrating the application of a process assumption to the digital model depicted in FIG. 4B for machine learning and prediction in providing an automated method for integrated analysis of BEOL structures to determine whether the process flow for forming the BEOL structures is within the process window.

FIG. 4A illustrates a plurality of metal lines in a back end of the line (BEOL) structure illustrating an image taken of the BEOL structure by automated transition electron microscope (TEM) preparation and imaging for detection of variations within the process window for a first embodiment of chemical mechanical planarization (CMP) processes. The image depicted in FIG. 4A illustrates another example of the output of the transmission electron microscope (TEM) 24 that can be used to produce images for the machine image processor 25 as part of the process flow for producing the predictive algorithm used by the manufacturing prediction actuator 27, which is produced by the samples 10 of the historical data 20. The dimensions are mapped from the OCD 21 to the TEM image. FIG. 4B depicts a machine image processing of the image depicted in FIG. 4A that outputs a digital model with dimensions based on the TEM image depicted in FIG. 4A. FIG. 4B illustrates one example of the output of the machine image processor 25 for providing data to the machine learning engine 26. The digital model includes accurate H1, H2 dimensions based on the TEM 24, which included the dimensions measured from the OCD 21. In this example, a first height dimension is a line height H1 and a second height dimension for an interlevel dielectric layer H2 (also referred to as stud height) providing separation between stacked metal lines. FIG. 4C illustrates the application of a process assumption to the digital model depicted in FIG. 4B. In this example, the process assumption model includes a specification line height H3 for the metal lines and a specification height H4 for the interlevel dielectric between the stacks of metal lines. The box with the dotted line identified by reference number 40 is an overlay of the specification for the metal line from the process assumption model. In some embodiments, variation of the process assumption model from the measured dimensions is taken from a reference point 41.

Referring to FIGS. 4A-4C, from the detected variation from the process assumption model, as well as any variation in the measured electrical performance for the samples from the process assumption model specification for the electrical performance, the learning machine engine 26 produces a predictive algorithm that detects issues with planarization processes, e.g., whether the planarization process, such as chemical mechanical planarization, is operating within a process window that can provide back end of the line (BEOL) structures meeting the process assumption model specification.

In one example, the predictive algorithm includes the following conditions: if a planarization issue is present, e.g., the chemical mechanical planarization (CMP) process is outside the process window, the stud height for the BEOL structures will be too short, the line height may be on target, and the electrical resistance is higher than the target value. One example of this scenario is depicted in FIGS. 3A-3C, in which the stud height, i.e., comparison of H2 and H4, is on target, but a significant difference, e.g., a difference of 10 nm or greater, is present between the line height for the process assumption and the actual dimension of the line height, e.g., comparison of H1 and H3. This scenario is indicative of a planarization issue in the production track 30. Further, a line resistance that is greater than the process assumption is also indicative of a planarization issue.

In view of the dimensions for the BEOL structures depicted in FIGS. 4A-4C, and in-line resistance testing indicating that the line resistance for the metal lines is less than the process assumption value, the manufacturing prediction actuator 27 sends instructions to the apparatus actuator 35 that the planarization sector, e.g., chemical mechanical planarization (CMP) sector, is the likely origin of process deviation. For example, the manufacturing prediction actuator 27 can send instructions to the apparatus actuator 35 to make automated adjustments, e.g., CMP removal rates, to the apparatus 31 in the production track 30.

Figure 5A:
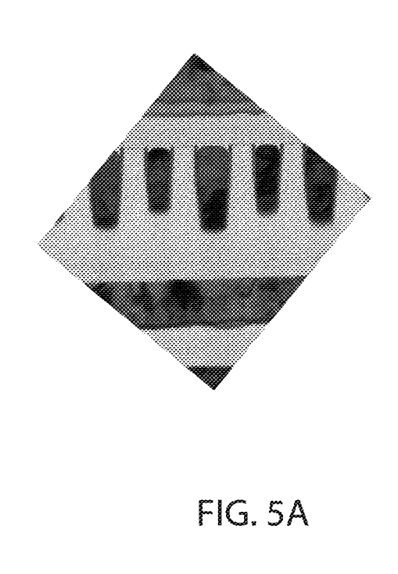
FIG. 5A is a side cross-sectional view illustrating a plurality of metal lines in a back end of the line (BEOL) structure illustrating an image taken of the BEOL structure by automated transition electron microscope (TEM) preparation and imaging for detection of variations within the process window for lithographic processing.
Figure 5B:
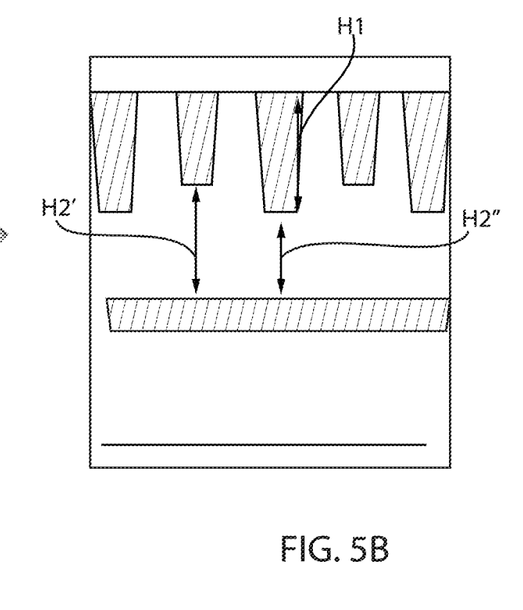
FIG. 5B is a side cross-sectional view of machine image processing of the image depicted in FIG. 5A that outputs a digital model with dimensions based on the TEM image depicted in FIG. 5A.
Figure 5C:
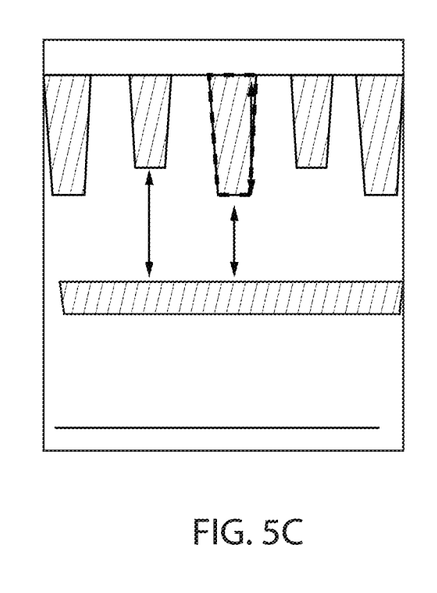
FIG. 5C is a side cross-sectional view illustrating the application of a process assumption to the digital model depicted in FIG. 5B for machine learning and prediction in providing an automated method for integrated analysis of BEOL structures to determine whether the process flow for forming the BEOL structures is within the process window.

FIG. 5A illustrates a plurality of metal lines in a back end of the line (BEOL) structure illustrating an image taken of the BEOL structure by automated transition electron microscope (TEM) preparation and imaging for detection of variations within the process window for lithographic processing. The dimensions are mapped from the OCD 21 to the TEM image. FIG. 5B illustrates machine image processing of the image depicted in FIG. 5A that outputs a digital model with dimensions based on the TEM image. FIG. 5B illustrates one example of the output of the machine image processor 25 for providing data to the machine learning engine 26. The digital model includes accurate H1, H2 dimensions based on the TEM 24, which included the dimensions measured from the OCD 21. In this example, a first height dimension is a line height H1 and a second height dimension for an interlevel dielectric layer H2', H2" providing separation between stacked metal lines, which is also referred to as stud height. FIG. 5C illustrates the application of a process assumption to the digital model depicted in FIG. 5B for machine learning and prediction in providing an automated method for integrated analysis of back end of the line (BEOL) structures to determine whether the process flow for forming the BEOL structures is within the process window. In this example, the process assumption model includes a specification line height H3 for the metal lines and a specification height H4', H4" for the interlevel dielectric, i.e., stud height, between the stacks of metal lines. The box with the dotted line identified by reference number 40 is an overlay of the specification for the metal line from the process assumption model.

Referring to FIGS. 5A-5C, from the detected variation from the process assumption model, as well as any variation in the measured electrical performance for the samples from the process assumption model specification for the electrical performance, the learning machine engine 26 produces a predictive algorithm that detects issues with the lithography processes, e.g., whether the lithography process, such as masking and/or exposure and/or developing, is operating within a process window that can provide back end of the line (BEOL) structures meeting the process assumption model specification. In one example, the predictive algorithm includes the following conditions: if a lithography issue is present, e.g., the lithography process is outside the process window, the stud height and trench height will vary from line to line, but the overall electrical resistance can be similar to the process assumption model specification. One example of this scenario is depicted in FIGS. 5A-5C, in which both the line height H1, H2 and the stud height H3, H4', H4" for the metal lines of the back end of the line (BEOL) structures varies from line to line. The high variation in the stud height and the metal line height, as depicted in FIGS. 5A-5C, in combination with a line resistance having a high variation line to line, but having an overall average with the process assumption model specification, is indicative of a variation in the lithography processes that causes the production samples to be outside the specification of the process assumption model.

In view of the dimensions for the metal lines depicted in FIGS. 5A-5C, and in-line resistance testing indicating that the line resistance for the metal lines is overall within the specification but having a high line to line variation, the manufacturing prediction actuator 27 sends instructions to the apparatus actuator 35 that the lithography sector, e.g., production apparatus 31 for lithography processes, is the likely origin of process deviation. For example, the manufacturing prediction actuator 27 can send instructions to the apparatus actuator 35 to make automated adjustments to the apparatus 31 for lithography in the production track 30 to account for pitch walking.

Figure 6A:
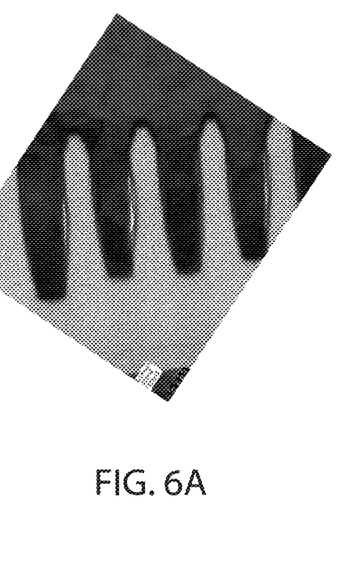
FIG. 6A is a side cross-sectional view illustrating a plurality of metal lines in a BEOL structure illustrating an image taken by automated TEM for detection of variations within the process window for metallization.
Figure 6B:
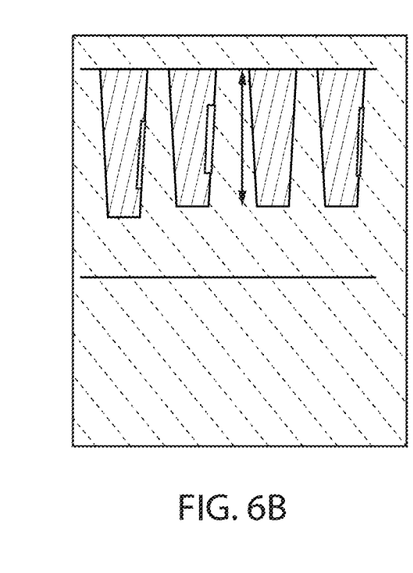
FIG. 6B is a side cross-sectional view of machine image processing of the image depicted in FIG. 6A that outputs a digital model with dimensions based on the TEM image depicted in FIG. 6A.
Figure 6C:
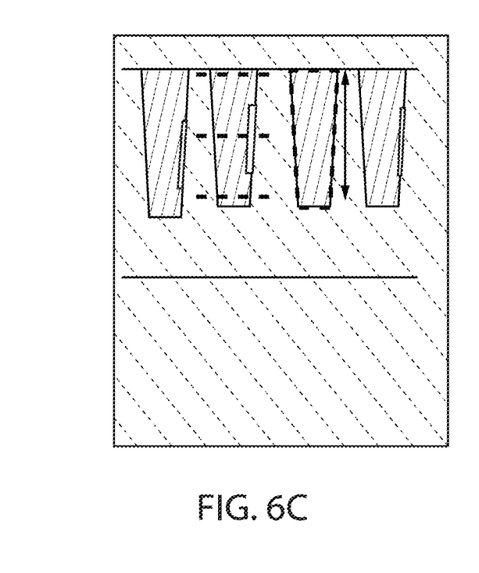
FIG. 6C is a side cross-sectional view illustrating the application of a process assumption to the digital model depicted in FIG. 6B for machine learning and prediction in providing an automated method for integrated analysis of BEOL structures to determine whether the process flow for forming the BEOL structures is within the process window.

FIG. 6A depicts a plurality of metal lines in a back end of the line (BEOL) structure illustrating an image taken of the BEOL structure by automated transition electron microscope (TEM) preparation and imaging for detection of variations within the process window for metallization. FIG. 6B depicts a machine image processing of the image depicted in FIG. 6A that outputs a digital model with dimensions based on the TEM image depicted in FIG. 6A. FIG. 6C illustrates the application of a process assumption to the digital model depicted in FIG. 6B for machine learning and prediction in providing an automated method for integrated analysis of back end of the line (BEOL) structures to determine whether the process flow for forming the BEOL structures is within the process window. In FIGS. 6A-6C, the line height measured from the production samples is identified by reference letter H1, and the line height from the process assumption model is identified by reference number H3. The box with the dotted line identified by reference number 40 is an overlay of the specification for the metal line from the process assumption model.

Referring to FIGS. 6A-6C, from the detected variation from the process assumption model, as well as any variation in the measured electrical performance for the samples from the process assumption model specification for the electrical performance, the learning machine engine 26 produces a predictive algorithm that detects issues with the metallization processes, e.g., whether the metallization process, e.g., plating, physical vapor deposition or chemical vapor deposition, is operating within a process window that can provide back end of the line (BEOL) structures meeting the process assumption model specification. In one example, the predictive algorithm includes the following conditions: if a metallization issue is present, e.g., the metallization process is outside the process window resulting in delamination, the stud height and trench height can be on target, i.e., H1 is equal to H3, but there is a contrast variation at the side walls on the left and right hand side of the metal line in the trench. The contrast variations are the result of voids 42 present in the middle of the line sidewalls. Further, the line resistance measured by the in line electrical property testing apparatus 22 of the metal lines is higher than the specification of the process assumption model. The aforementioned contrast variations and high line resistance is indicative of a metallization problem with the production track 30. In view of the sidewall contrast variations and high resistance of the metal lines, the manufacturing prediction actuator 27 sends instructions to the apparatus actuator 35 that the metallization sector, e.g., production apparatus 31 for metallography processes, is the likely origin of process deviation.

Figure 7:
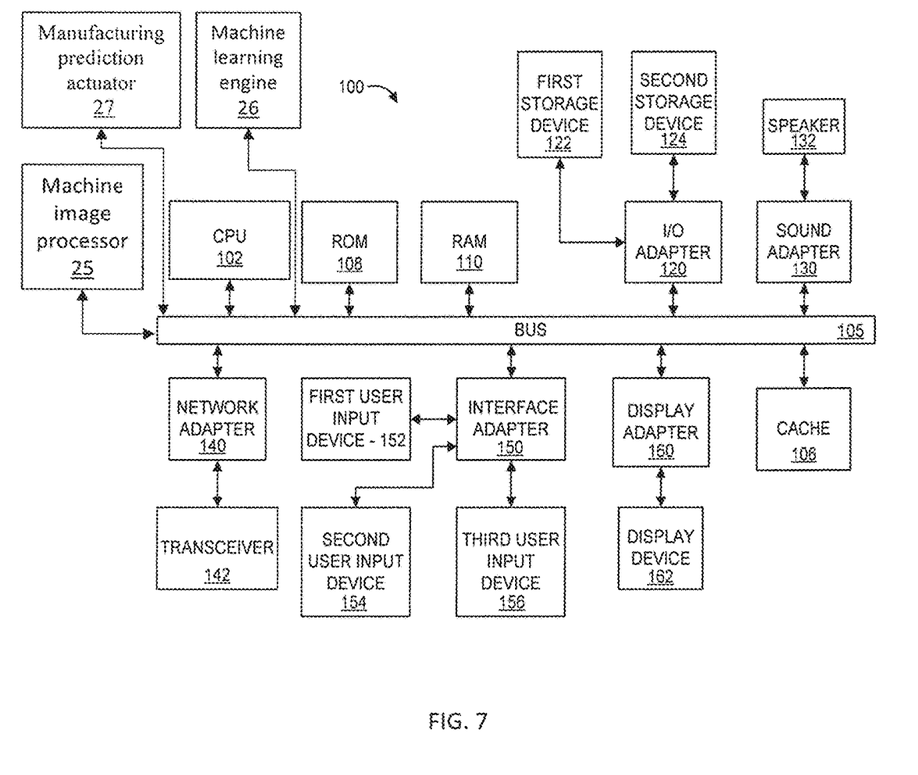
FIG. 7 is a block/flow diagram showing the components of a manufacturing prediction actuator that can be integrated with the system depicted in FIG. 1 and the method depicted in FIG. 2.

FIG. 7 depicts one embodiment of the components of a manufacturing prediction actuator that can be integrated with the system depicted in FIG. 1. In FIG. 8, the manufacturing prediction actuator 27, the machine leaning engine 26 and the machine image processor 25 are depicted in electrical communication with the system bus 105. FIG. 7 depicts one example of an exemplary processing system 100 to which the present invention may be applied. The processing system 100 includes at least one processor (CPU) 102 operatively coupled to other components via a system bus 105. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 105.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices. A speaker 132 is operatively coupled to system bus 102 by the sound adapter 130. A transceiver 142 is operatively coupled to system bus 102 by network adapter 140. A display device 162 is operatively coupled to system bus 102 by display adapter 160. A first user input device 152, a second user input device 154, and a third user input device 156 are operatively coupled to system bus 102 by user interface adapter 150. The first input device 152 may be receive an image from the scanning electron microscope (SEM) providing the automated nano-scale imaging 23 and/or a cross-section transmission electron microscope (TEM) 24. The second input device 154 may be an input for the optical critical dimensions (OCD) 21, 31 are taken using an optical diffraction measurement as part of the historical data 20 track or the production track 30. The third input device 156 may be an input for electrical performance measurements taken from the in line electrical property testing apparatus 22 of the historical data track 20 and/or the in line electrical property testing apparatus 32 of the production track 30. The system depicted in FIG. 7 may also include other input devices, such as any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The system may further include an output device 158 for providing instructions to the apparatus actuator 35.

Having described preferred embodiments of an automated method for integrated analysis of BEOL yield, line resistance/capacitance and process performance (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A system of electrical device manufacturing comprising:
    an optical measuring device for measuring a first plurality of dimensions from a back end of the line (BEOL) structure of an electrical device;
    an in line electrical performance measuring apparatus for measuring in line resistance of BEOL structures;
    a machine vision image processor for comparing the first plurality of dimensions with a second plurality of dimensions from a process assumption model to determine dimension variations;
    a machine learning engine for applying machine learning to the dimension variations and electrical variations in the in line electrical measurements from the process assumption model, wherein the plurality of scenarios for process modifications are responsive to dimension and electrical variations in production BEOL structures;
    manufacturing prediction actuator for receiving production dimension measurements and production electrical measurements from a production track, wherein when at least one of the dimensions or electrical measurements received match one of the plurality of scenarios the manufacturing prediction actuator effectuates a process change to bring production of the BEOL within the process assumption model; and
    a production track manufacturing an electrical device with said process change to bring production of the BEOL structures within the process assumption model.

2. The system of claim 1, wherein said optical measuring device comprises an optical diffraction apparatus.

3. The system of claim 1, wherein the machine learning engine is provided by a learning scheme selected from the group consisting of tree learning, associated rule learning, artificial neural networks, deep tree learning, inductive logic programming, support vector machines, clustering, bayesian networks, reinforcement learning, representation learning, similarity and metric learning, sparse dictionary learning, genetic algorithms, rule-based machine learning, learning classifier systems and combinations thereof.

4. The system of claim 1, wherein the plurality of scenarios for process modifications are responsive to dimension and electrical variations is an production apparatus adjustment that is selected from the group consisting of etch apparatus, process modifications for lithography apparatus, process modifications for metallization apparatus, and combinations thereof.

5. The system of claim 1, wherein the BEOL structure comprises a metal line.

6. The system of claim 1, wherein the first plurality of dimensions from the BEOL structure comprises a metal line width, metal line height or a combination thereof.

7. A non-transitory computer readable storage medium comprising a computer readable program for electrical device manufacturing, wherein the non-transitory computer readable program when executed on a computer causes the computer to perform the steps of:
    comparing a first plurality of dimensions measured from a back end of the line (BEOL) structure with a second plurality of dimensions from a process assumption model to determine dimension variations by machine vision image processing;
    providing a plurality of scenarios for process modifications by applying machine learning to the dimension variations and electrical variations measured with in line electrical measurements from the process assumption model;
    receiving production dimension and electrical measurements at a manufacturing prediction actuator, wherein when at least one of the dimensions or electrical measurements received match one of the plurality of scenarios, the manufacturing prediction actuator using the plurality of scenarios for process modifications effectuates a process change to bring production of the BEOL structures within the process assumption model; and
    manufacturing an electrical device with said process change to bring production of the BEOL structures within the process assumption model.

8. The non-transitory computer readable storage medium of claim 7, the method further comprising mapping the first plurality of dimensions taken from back end of the line (BEOL) structures from historical samples to a cross sectional image taken by transmission electron microscope (TEM).

9. The non-transitory computer readable storage medium of claim 7, wherein the first plurality of dimensions from the BEOL structure comprises a metal line width, metal line height or a combination thereof.

10. The non-transitory computer readable storage medium of claim 7, wherein the first plurality of dimensions from the BEOL structure comprises a stud height, top variation in the metal line height, side variation in the metal line height, or a combination thereof.

* * * * *